(12) United States Patent
Hänsch

(10) Patent No.: US 9,783,979 B2
(45) Date of Patent: Oct. 10, 2017

(54) WEATHER PROTECTION DEVICE

(71) Applicant: Ettlin Aktiengesellschaft, Ettlingen (DE)

(72) Inventor: Frauke Susanne Hänsch, Karlsruhe (DE)

(73) Assignee: Ettlin Aktiengesellschaft, Ettlingen (DE)

( * ) Notice: Subject to any disclaimer, the term of this patent is extended or adjusted under 35 U.S.C. 154(b) by 354 days.

(21) Appl. No.: 14/087,966

(22) Filed: Nov. 22, 2013

(65) Prior Publication Data
US 2014/0080375 A1 Mar. 20, 2014

Related U.S. Application Data

(63) Continuation of application No. PCT/EP2012/059641, filed on May 23, 2012.

(30) Foreign Application Priority Data

May 23, 2011 (EP) .................................. 11167175

(51) Int. Cl.
| | |
|---|---|
| *E04B 1/62* | (2006.01) |
| *D03D 1/00* | (2006.01) |
| *D03D 9/00* | (2006.01) |
| *D03D 19/00* | (2006.01) |

(52) U.S. Cl.
CPC ............. *E04B 1/625* (2013.01); *D03D 1/007* (2013.01); *D03D 9/00* (2013.01); *D03D 19/00* (2013.01); *D10B 2401/02* (2013.01); *Y10T 29/49* (2015.01); *Y10T 442/259* (2015.04); *Y10T 442/2598* (2015.04); *Y10T 442/3179* (2015.04)

(58) Field of Classification Search
None
See application file for complete search history.

(56) References Cited

U.S. PATENT DOCUMENTS

| | | | |
|---|---|---|---|
| 3,417,794 A | 12/1968 | Lynch et al. | |
| 7,287,553 B2 * | 10/2007 | Wahhoud .................. | D03C 7/06 139/101 |
| 7,554,730 B1 * | 6/2009 | Kuo ........................ | G03B 21/56 359/443 |
| 2003/0186606 A1 | 10/2003 | Sutherland et al. | |
| 2004/0142618 A1 * | 7/2004 | Porter .................. | B28B 19/0092 442/266 |
| 2005/0144901 A1 * | 7/2005 | Egan ........................ | D03D 1/00 52/782.1 |

(Continued)

FOREIGN PATENT DOCUMENTS

EP 2 284 306 A1 2/2011

*Primary Examiner* — Arti Singh-Pandey
(74) *Attorney, Agent, or Firm* — Bose McKinney & Evans LLP

(57) ABSTRACT

The invention relates to a weatherproofing arrangement having a textile sheet material which forms a screen against the effects of weather, in particular against solar radiation and/or rain, and has warp threads and weft threads connected to one another in the manner of latticework. In order to achieve particular protective functions, it is proposed for the warp threads and weft threads to bound elongate-rectangular latticework openings, wherein the length of these openings is at least 10 times the width thereof, and wherein the width of the openings is from between 0.1 and 0.001 mm.

23 Claims, 1 Drawing Sheet

(56) References Cited

U.S. PATENT DOCUMENTS

| | | | |
|---|---|---|---|
| 2007/0021020 A1* | 1/2007 | Pinton | D06M 1/46 442/59 |
| 2008/0151569 A1* | 6/2008 | Wang | A47G 33/06 362/249.16 |
| 2012/0127704 A1* | 5/2012 | Hansch | D03D 9/00 362/217.02 |

* cited by examiner

WEATHER PROTECTION DEVICE

RELATED APPLICATIONS

This application claims priority to PCT/EP2012/059641, filed May 23, 2012, and EP 11 167 175.6, filed May 23, 2011, both of which are hereby incorporated herein by reference in their entireties.

BACKGROUND

The invention relates to a weather protection device having a textile sheet-like material arranged as a shielding against weather influences, in particular against solar radiation and/or rain, said textile sheet-like material having warp threads and weft threads connected to one another in the manner of a grid.

Shading textiles are known which are intended, for example, as a parasol, to offer protection against solar radiation in the form of heat (IR radiation) and UV radiation. As a rule, very dense plain-weave fabrics are used here which may have been vapor-coated with a metal (e.g., aluminum) for improved reflection of incident radiation. A common feature of known shading textiles is that, as a rule, they are impermeable to air on account of the density and/or coating required for protective reasons, and so heat accumulation often takes place beneath them. The upwardly restricted field of vision is also considered to be disadvantageous.

SUMMARY

Proceeding from here, the invention is based on the idea of further improving the devices known from the prior art and of providing a protection device having improved functional characteristics.

The invention proceeds from the idea of achieving a particular functionality of a weather protection device by narrow, slot-like grid openings. It is accordingly proposed according to this disclosure that the warp threads and weft threads delimit elongate-rectangular grid openings, the opening length, that is to say the clear extent in the longitudinal direction of the grid openings, amounting to at least ten times the opening width of the grid openings and the opening width being in the range between 0.1 and 0.01 mm. In this manner, the grid openings can be adapted such that the view and the passage of air through them are improved while undesirable radiation and precipitation are largely kept away by the narrow longitudinal delimitations.

Advantageously, the opening width is between 0.07 and 0.03, preferably about 0.06 mm, so that rain water does not pass through on account of the surface tension and solar radiation is largely reflected and/or absorbed.

According to an advantageous embodiment of this disclosure, the grid openings are delimited on the longitudinal sides by the weft threads, so that manufacturing can also be simplified.

In order to ensure a particular dimensional stability and impermeability of the grid geometry, it is of advantage for the textile sheet-like material (i.e., textile fabric) to have a two-layered fabric structure of warp threads which form a warp-thread layer, and of weft threads which form a weft-thread layer lying on one side of the warp-thread layer, the warp threads and the weft threads being stretched in a substantially rectilineal manner. It is advantageous here for the warp threads and the weft threads to be connected to one another by binder threads in a leno weave, the binder threads wrapping around the outer sides, which face away from one another, of the warp and weft threads.

With a view to manufacturing a defined grid structure, it is favorable for the textile sheet-like material to be formed from filament yarns, preferably from monofilament yarn material. Alternatively, it is also possible to use fibrous yarns made from multifilaments.

Advantageously, the textile sheet-like material is composed of a polymer thread material, preferably being formed to include PET, PTFE, PVDF or polyacrylic.

A further advantageous embodiment provides that the thread thickness of the warp threads and weft threads lies in the range between 0.08 mm and 0.3 mm, and the binder threads have a thread thickness of 0.05 to 0.1 mm. It is favorable here for the thread thickness of the binder threads to amount to about 50% of the thread thickness of the ground threads (warp threads and weft threads). As a result of this, it is possible for the dimensions of the grid openings to be about 1.2 mm by 0.06 mm and for the coverage by the thread material to amount to approximately 70%.

In the case of the textile weather protection, a distinction has to be made between the UV exposure and thus the protection of the textile surface itself against UV radiation and its functionality as a shielding.

The textile sheet-like material is used outdoors and is therefore subjected to deterioration by UV rays of sunlight. In order to render the material resistant to this UV radiation, it is advantageous for the material which is used to be colored dark or black. To this end, dark pigments, for example in the form of carbon black, are added to the spinning composition. In this manner, it is possible for the radiation to enter the pigments and not only the polymer thread material. Furthermore, a UV stabilizer in the form of additives can be introduced into the thread material, expediently already in the spinning compound prior to spinning. These may be additives based on 2,2(p-phenylene)di-3,1-benzoxazin-4-one.

Accordingly, it is advantageous for the textile sheet-like material to be composed of a preferably dark colored thread material which is provided with additives for UV stabilization and/or for radiation absorption.

The textile surface acts as a weather protection which keeps away water and undesirable radiation, above all in the UV range and IR range, while air and visible light can pass through. The basis for this are the narrow grid openings, which enable the passage of light and air and also offer a certain protection against the passage of water. However, the grid openings of the textile sheet-like material alone do not provide sufficiently perfect protection against rain. Surprisingly, it has been demonstrated that said protection against rain can be significantly improved in combination with an additional hydrophobic finish or configuration of the warp and weft threads.

With a view to a rain-repellant function, it is accordingly of particular advantage for the textile sheet-like material to be finished with a waterproofing agent, for example with fluorocarbon or fluoropolymers, so as to be hydrophobic. Alternatively or additionally, waterproofing can also be achieved with a suitable surface treatment, for example a plasma treatment, of the fiber or thread material.

In order to reduce the transmission of UV radiation and IR radiation, and thus to protect the user, the textile surface is advantageously provided with an additional coating. The coating here should enclose the thread material, expediently without closing the elongate grid openings. This enables the passage of air and at the same time the undesirable types of radiation are reduced by UV absorbers such as titanium dioxide, or IR reflectors such as silver ions.

It is accordingly advantageous for the textile sheet-like material to be provided with a coating which acts as a UV filter and/or IR reflector, the grid openings being kept free. A soil-repellent function may also be achieved via a suitable coating.

In order to shield a large area, it is advantageous for the textile sheet-like material to be stretched out, in particular as an umbrella or parasol, in a tensioning device.

A further advantageous application provides that the textile sheet-like material is unrollable, in particular as an awning, by means of a winding device.

In general, the particular protection purposes are achieved in that the textile sheet-like material is located in the open air as sun protection and/or rain protection on or outside a building.

The use or arrangement of a textile sheet-like material according to this disclosure as shielding against rain and radiation on the outside of a building is thus also subject matter of this disclosure. Above all, punctiform connections are suitable for the two-dimensional stretching-out on a building, for example via eyelets in the sheet-like material, this also being advantageous with a view to the introduction of forces.

A high elasticity and resistance to shear loading results from the particular half-cross leno fabric weave. This not only improves the introduction of forces in the use state but also simplifies cutting during manufacturing.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

Figure 1:
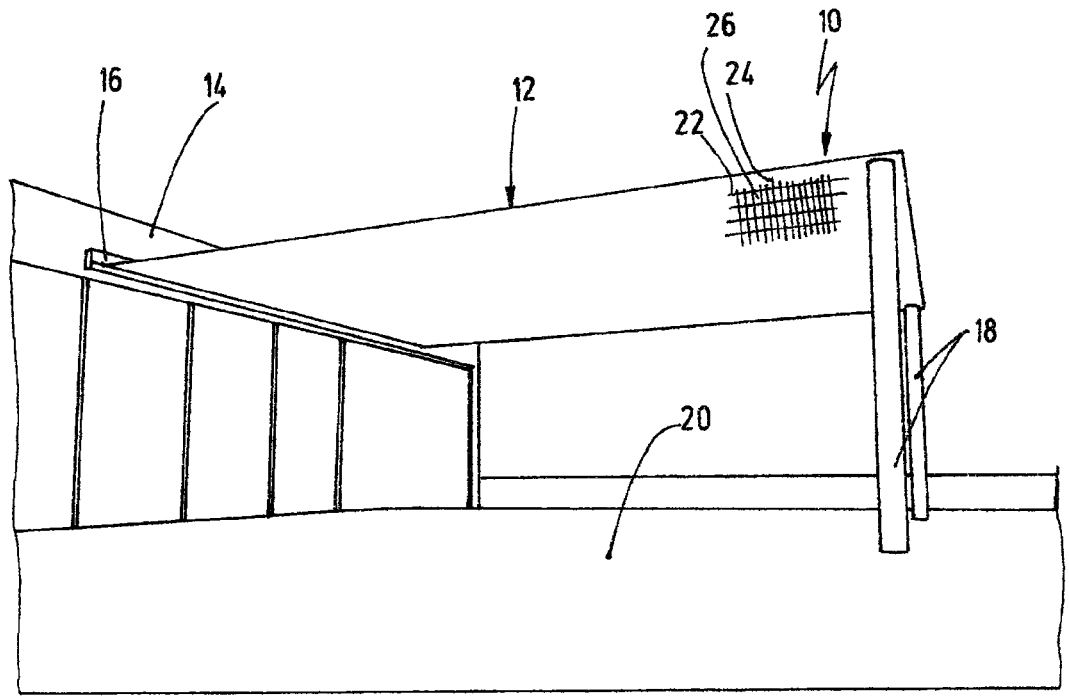
FIG. 1 shows a weather protection device in the form of a textile sheet-like material, which is stretched out on a building, in a diagrammatic illustration.

The embodiments described below are not intended to be exhaustive or to limit the invention to the precise forms disclosed in the following detailed description. Rather, the embodiments are chosen and described so that others skilled in the art may appreciate and understand the principles and practices of the present invention.

The weather protection device 10 comprises a textile sheet-like material 12 which is stretched out on the outside of a building 14 as shielding against solar radiation or rain. To this end, the textile sheet-like material 12 is extendable in the form of a web from a winding device 16 and can be fixed at its free end on supports 18. Here, a shielded region 20 under the textile sheet-like material 12 is protected against direct solar radiation and against rain.

As indicated in FIG. 1 in a manner which is not to scale, the textile sheet-like material has warp threads 22 and weft threads 24 which are connected to one another in the manner of a grid. The warp threads 22 run in the longitudinal direction of the fabric web with a relatively large mutual distance between threads, while the weft threads 24 rectangularly cross the warp threads 22, maintaining a relatively narrow mutual distance between threads. In this way, elongate-rectangular grid openings 26, which enable a certain transparency and air permeability, are kept free in the grid-like sheet-like material 12, whereas penetration by rain is largely prevented by the narrow slots.

Figure 2:
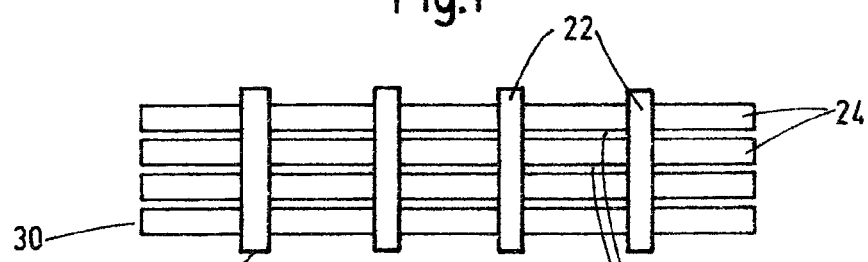
FIG. 2 shows the layer-wise arrangement of the warp and weft threads of the textile sheet-like material in a plan view of a warp-side detail.

As is illustrated in FIG. 2, the textile sheet-like material has a two-layered fabric structure in which the warp threads 22 and weft threads 24 are rectilineally stretched and in each case form a separate planar thread layer. Consequently, the warp thread layer 28 lies with one side on the weft thread layer 30, the warp thread layer 28 forming the underside of the fabric facing the shielded region 20 and the weft thread layer 30 forming the fabric upper side facing upward.

When viewed in the direction of the surface normal of the textile sheet-like material 12, clear grid openings 26 thus result which are delimited on the longitudinal sides by the weft threads 24 and across the width by the warp threads 22. The opening length of the grid openings 26, that is to say the clear distance between the warp thread edges facing one another, is in this case at least ten times the opening width between the weft thread edges facing one another, the opening width being smaller than 0.07 mm and preferably amounting to 0.06 mm on account of the high weft thread density. The warp thread density is significantly lower than the weft thread density, the distance from thread center to thread center here lying between 0.5 mm and 5 mm. The distances here are subject to slight tolerances which result from deviations in the thread diameter and in the weaving accuracy.

Figure 3:
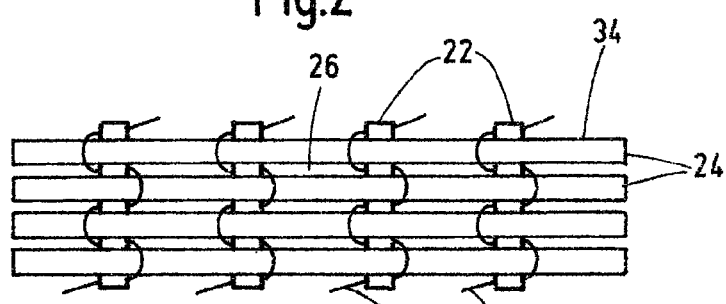
FIG. 3 shows a detail of the textile sheet-like material including binder threads in a plan view of the warp side.

As shown in FIG. 3, the warp threads 22 and weft threads 24 are fixed in their reciprocal positions by thin binder threads 32 in the manner of a leno weave. The binder threads 32 in this case traverse the two thread layers of the warp threads and weft threads and wrap around the outer sides thereof which face away from one another.

The warp threads, weft threads and binder threads are expediently composed of a monofilament polymeric thread material, for example of PET. Additives for UV stabilization and for radiation absorption are added to the threads. The thread material has a dark, e.g., black, color. The thread thicknesses of the warp threads 22 and weft threads 24 lie in the range of between 0.08 and 0.3 mm, the thinner binder threads having a thickness of 0.05 to 0.1 mm.

On account of the stated thread densities, a dense sheet-like material 12 having unidimensionally large grid openings 26 is created. The weft threads 24 provide the dense surface, while the slot-like intermediate spaces 26 between the weft threads 24 remain free on account of the low warp density. The opening size and opening shape enable an adequate passage of air, whereas the passage of water is not possible because of the small distance between weft threads. In a supporting manner, the textile sheet-like material 12 is finished so as to be hydrophobic, such that even drops of water which impact with force cannot pass through.

The shading or solar protection function is achieved via the reflection on the thread surfaces. In order to avoid the situation where radiation which is reflected between the threads 22, 24 passes through the sheet-like material 12, radiation-absorbing additives are added to the thread material and the actual surface is coated without closing the grid openings 26. The coating 34 contains UV filters or also IR reflectors. The protection rating of the textile sheet-like material 12 as a whole can be set via the weft thread density and thus the distances between threads, and via the thread diameters. In principle, a zone-wise variation of the thread densities and thread thicknesses is possible in order to accordingly modify the protection functions.

A wide variety of application possibilities exist for the weather protection functions mentioned, for example including as an umbrella or parasol. The textile material can be folded in a space-saving manner or rolled up by means of a tensioning device or winding device. In principle, permanent deployment in a stretched-out manner, in particular as a façade cladding on a building, is also conceivable.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A weather protection device for shielding against weather influences, comprising a textile sheet material having warp threads and weft threads connected to one another in a grid, the warp threads and weft threads delimiting elongate rectangular grid openings, the opening length of the grid openings being at least ten times the opening width of the grid openings, the opening width being between 0.1 mm and 0.01 mm, the textile sheet-like material being hydrophobic and air permeable and being configured for location in open air as sun protection and/or rain protection on or outside a building.

2. The weather protection device as claimed in claim 1, wherein the opening width is between 0.07 and 0.03 mm.

3. The weather protection device as claimed in claim 2, wherein the opening width is about 0.06 mm.

4. The weather protection device as claimed in claim 1, wherein the grid openings are delimited on the longitudinal sides by the weft threads.

5. The weather protection device as claimed in claim 1, wherein the textile sheet material comprises a two-layered fabric structure of warp threads which form a warp-thread layer, and of weft threads which form a weft-thread layer lying on one side of the warp-thread layer, the warp threads and the weft threads being stretched in a substantially rectilineal manner.

6. The weather protection device as claimed in claim 1, wherein the warp threads and the weft threads are connected to one another by binder threads in a leno weave, the binder threads wrapping around the outer sides, which face away from one another, of the warp and weft threads.

7. The weather protection device as claimed in claim 1, wherein the textile sheet material is formed of filament yarns.

8. The weather protection device as claimed in claim 1, wherein the textile sheet material comprises a polymer thread material of PET, PTFE, PVDF or polyacrylic.

9. The weather protection device as claimed in claim 1, wherein the thread thickness of the warp threads and weft threads is between 0.08 mm and 0.3 mm.

10. The weather protection device as claimed in claim 9, wherein the binder threads have a thread thickness of 0.05 to 0.1 mm.

11. The weather protection device as claimed in claim 1, wherein the textile sheet material comprises a dark colored thread material which is provided with additives for UV stabilization and/or for radiation absorption.

12. The weather protection device as claimed in claim 1, wherein the textile sheet material comprises a coating which acts as UV filter and/or IR reflector, the grid openings being kept free.

13. The weather protection device as claimed in claim 1, wherein the textile sheet material is stretched out on an umbrella, parasol or tensioning device.

14. The weather protection device as claimed in claim 1, wherein the textile sheet-like material is finished with a water-proofing agent.

15. The weather protection device of claim 1, wherein the textile sheet material is finished with a hydrophobic fluorocarbon or fluoropolymer.

16. A method of providing a screen against the effects of weather, comprising:
   providing warp threads and weft threads connected to one another in a latticework to form a textile fabric, the latticework defining elongate-rectangular openings whose length is at least 10 times their width and the width of the openings is between 0.1 to 0.001 mm;
   finishing the threads with a waterproofing agent to render the textile fabric hydrophobic; and
   placing the textile fabric in an outside environment.

17. The method of claim 16, further comprising stretching out the textile material to form an umbrella or parasol, wherein the textile material is permeable to air and substantially impermeable to water.

18. The method of claim 16, further comprising locating the textile fabric in open air or outside a building to provide sun protection and/or rain protection, wherein the textile material is permeable to air and substantially impermeable to water.

19. The method of claim 16, further comprising coating the textile fabric with a UV filter and/or IR reflector material while maintaining the grid openings free.

20. A weather protection device for shielding against weather influences, comprising a textile sheet material having warp threads and weft threads connected to one another in a grid, the warp threads and weft threads delimiting elongate rectangular grid openings, the opening length of the grid openings being at least ten times the opening width of the grid openings, the opening width being between 0.1 mm and 0.01 mm, the textile sheet material being hydrophobic and air permeable,
   wherein the textile sheet material comprises a two-layered fabric structure of warp threads which form a warp-thread layer, and of weft threads which form a weft-thread layer lying on one side of the warp-thread layer, the warp threads and the weft threads being stretched in a substantially rectilineal manner.

21. The weather protection device of claim 20, wherein the textile sheet material is finished with a hydrophobic fluorocarbon or fluoropolymer.

22. A weather protection device for shielding against weather influences, comprising a textile sheet material having warp threads and weft threads connected to one another in a grid, the warp threads and weft threads delimiting elongate rectangular grid openings, the opening length of the grid openings being at least ten times the opening width of the grid openings, the opening width being between 0.1 mm and 0.01 mm, and the textile sheet-like material being hydrophobic, wherein the textile sheet material provides sun protection and/or rain protection while simultaneously allowing air and visible light to pass through.

23. The weather protection device of claim 22, wherein the textile sheet material is finished with a hydrophobic fluorocarbon or fluoropolymer.

\* \* \* \* \*